United States Patent
Ward

(10) Patent No.: US 6,808,208 B2
(45) Date of Patent: Oct. 26, 2004

(54) FOOD/DRINK TAB/CHECK HOLDER

(76) Inventor: Sandra J. Ward, 29 Nicklaus Way, Clayton, NC (US) 27520

( * ) Notice: Subject to any disclaimer, the term of this patent is extended or adjusted under 35 U.S.C. 154(b) by 36 days.

(21) Appl. No.: 10/319,232

(22) Filed: Dec. 16, 2002

(65) Prior Publication Data

US 2004/0113416 A1 Jun. 17, 2004

(51) Int. Cl.[7] .............................. B42D 3/00; B42D 17/00
(52) U.S. Cl. ....................... 281/31; 281/15.1; 281/21.1; 281/44; 281/45; 116/323; 229/67.1; 283/30; 283/31; 283/60.2; 283/65; 359/802; 359/806; 359/807
(58) Field of Search ................................ 359/802, 807, 359/806; 281/45, 44, 15.1, 21.1, 31; 283/60.1, 60.2, 30, 31, 65; 116/323; 229/67.1

(56) References Cited

U.S. PATENT DOCUMENTS

| | | | |
|---|---|---|---|
| 4,072,231 A | | 2/1978 | Helms |
| 4,420,112 A | * | 12/1983 | Cline ........................... 229/72 |
| 4,582,739 A | | 4/1986 | Givens |
| 4,932,520 A | * | 6/1990 | Ciarcia et al. ............... 206/232 |
| 4,997,207 A | * | 3/1991 | Feldman ....................... 281/18 |
| 4,999,233 A | | 3/1991 | Probst et al. |
| 5,186,565 A | * | 2/1993 | Jack ............................. 402/79 |
| 5,355,115 A | * | 10/1994 | Goor et al. .................. 340/321 |
| 5,471,347 A | * | 11/1995 | Galiani ....................... 359/807 |
| 5,610,770 A | * | 3/1997 | Galiani ....................... 359/807 |
| 5,639,072 A | | 6/1997 | McCall |
| 5,813,748 A | * | 9/1998 | Maxymych ................. 362/154 |
| D411,739 S | | 6/1999 | Havens |
| 6,023,377 A | * | 2/2000 | Slager ........................ 359/802 |
| 6,044,601 A | | 4/2000 | Chmela et al. |
| 6,050,214 A | * | 4/2000 | OKeefe ....................... 116/323 |
| 6,257,621 B1 | * | 7/2001 | Smith ......................... 281/15.1 |
| 2002/0145280 A1 | * | 10/2002 | Bock .......................... 281/15.1 |
| 2002/0149193 A1 | * | 10/2002 | Takemura .................... 281/29 |

* cited by examiner

*Primary Examiner*—Andrea Wellington
*Assistant Examiner*—Mark Henderson

(57) ABSTRACT

A food/drink tab/check holder for making it easier for the customer to be able to read one's tab/check upon the receipt thereof. The food/drink tab/check holder includes a book having a front cover and a back cover being pivotally connected to the front cover and closable upon said front cover with the front cover having a side facing the back cover upon the book being closed and with the back cover having a side facing the front cover upon the book being closed; and also includes a tab/check member including a piece of paper being removably held within the book and having indicia displayed thereupon; and further includes an elongate magnifying member being movably attached to the book for enlarging the indicia for a user to easily view without having to use eyeglasses; and also includes a light-emitting assembly being attached to the book for providing light between the front and back covers upon the book being opened; and further includes a writing utensil being removably supported upon the book.

9 Claims, 1 Drawing Sheet

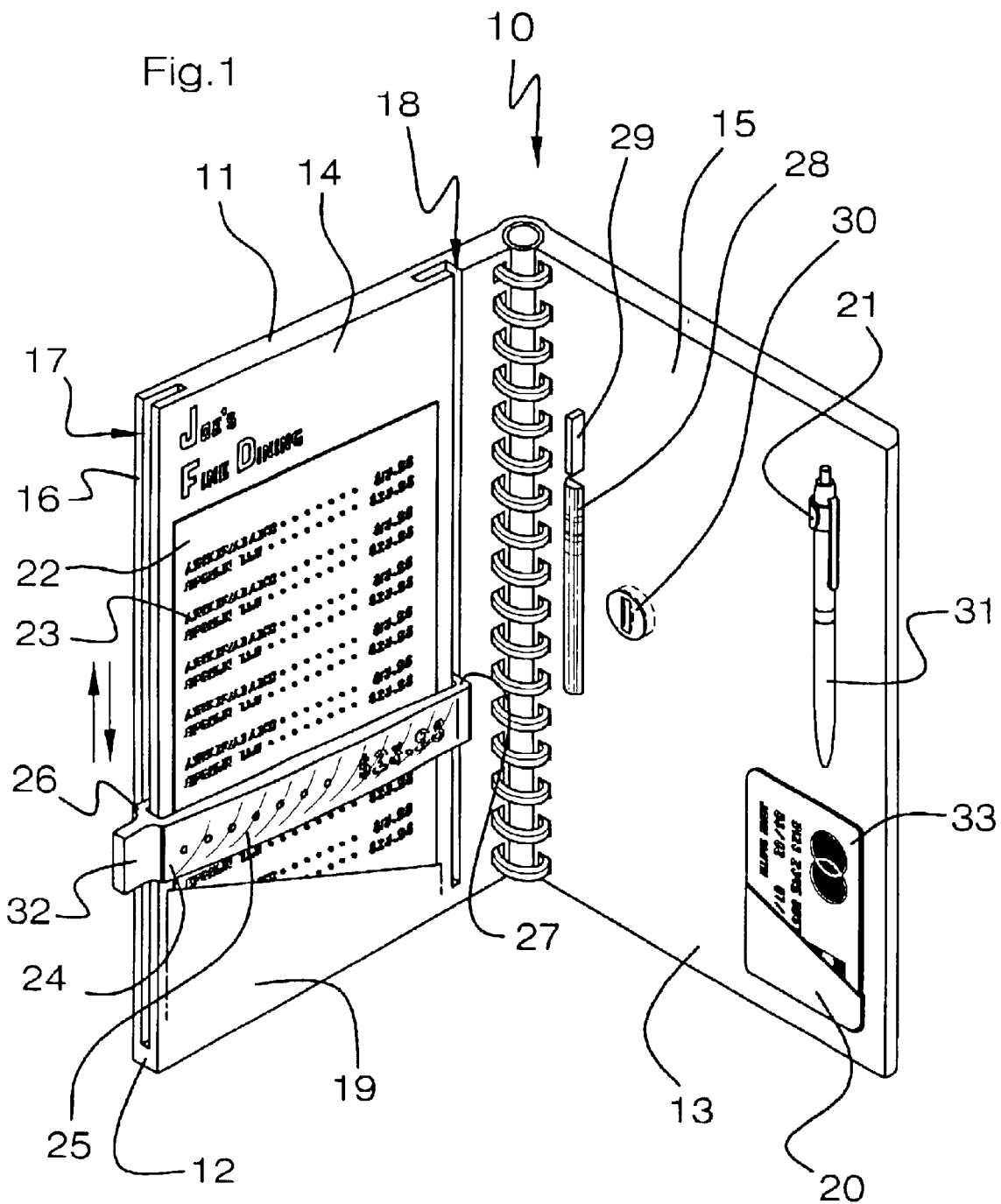

FOOD/DRINK TAB/CHECK HOLDER

BACKGROUND OF THE INVENTION

1. Field of the Invention

The present invention relates to bill holders and more particularly pertains to a new food/drink tab/check holder for making it easier for the customer to be able to read one's tab/check upon the receipt thereof.

2. Description of the Prior Art

The use of bill holders is known in the prior art. More specifically, bill holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,610,770; 1,567,643; 5,471,347; 4,850,680; 4,932,520; and Des. 183,382.

While these devices fulfill their respective, particular objectives and requirements, the aforementioned patents do not disclose a new food/drink tab/check holder. The prior art includes descriptions of various books but none having a magnifying member to enlarge the indicia printed on the tab/check.

SUMMARY OF THE INVENTION

The general purpose of the present invention, which will be described subsequently in greater detail, is to provide a new food/drink tab/check holder which has many of the advantages of the bill holders mentioned heretofore and many novel features that result in a new food/drink tab/check holder which is not anticipated, rendered obvious, suggested, or even implied by any of the prior art bill holders, either alone or in any combination thereof. The present invention includes a book having a front cover and a back cover being pivotally connected to the front cover and closable upon said front cover with the front cover having a side facing the back cover upon the book being closed and with the back cover having a side facing the front cover upon the book being closed; and also includes a tab/check member including a piece of paper being removably held within the book and having indicia displayed thereupon; and further includes an elongate magnifying member being movably attached to the book for enlarging the indicia for a user to easily view without having to use eyeglasses; and also includes a light-emitting assembly being attached to the book for providing light between the front and back covers upon the book being opened; and further includes a writing utensil being removably supported upon the book. None of the prior art includes the combination of the elements of the present invention.

There has thus been outlined, rather broadly, the more important features of the food/drink table/check holder in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of; other embodiments and of being practiced and carried out in various ways. Also, it is to be understood that the phraseology and terminology employed herein are for the purpose of description and should not be regarded as limiting.

It is an object of the present invention to provide a new food/drink tab/check holder which has many of the advantages of the bill holders mentioned heretofore and many novel features that result in a new food/drink tab/check holder which is not anticipated, rendered obvious, suggested, or even implied by any of the prior art bill holders, either alone or in any combination thereof.

Still another object of the present invention is to provide a new food/drink tab/check holder for making it easier for the customer to be able to read one's tab/check upon the receipt thereof.

Still yet another object of the present invention is to provide a new food/drink tab/check holder that is easy and convenient to set up and use.

Even still another object of the present invention is to provide a new food/drink tab/check holder that eliminates the customer from having to dig out one's eyeglasses to read the tab/check or to squint one's eyes to try to red the tab/check.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front perspective view of a new food/drink tab/check holder according to the present invention.

DESCRIPTION OF THE PREFERRED EMBODIMENT

With reference now to the drawings, and in particular to FIG. 1 thereof, a new food/drink tab/check holder embodying the principles and concepts of the present invention and generally designated by the reference numeral 10 will be described.

As best illustrated in FIG. 1, the food/drink tab/check holder 10 generally comprises a book 11 having a front cover 12 and a back cover 13 being pivotally and conventionally connected to the front cover 12 and closable upon the front cover 12. The front cover 12 has a side 14 facing the back cover 13 upon the book 11 being closed. The back cover 13 has a side 15 facing the front cover 12 upon the book 11 being closed. The book 11 includes a first pocket 19 being conventionally disposed upon the front cover 12, in particular, upon the side 14 facing the back cover 13; and also includes a second pocket 20 being conventionally disposed upon the back cover 13, in particular, upon the side 15 facing the front cover 12 and being adapted to hold a credit card 33 therein; and further includes a clip 21 being conventionally attached to the back cover 13, in particular, to the side 15 facing the front cover 12. The book 11 further includes a first elongate slot 17 being disposed in an outer longitudinal edge 16 of the front cover 12 and extending from near a bottom edge through a top edge of the front cover 12, and also includes a second elongate slot 18 being disposed in the front cover 12, in particular, in the side 14 facing the back cover 14 near an inner longitudinal edge of the front cover 12 and extending from near the bottom edge through the top edge of the front cover 12. The second elongate slot 18 has an L-shaped lateral cross-section. The clip 21 includes an arcuate-shaped member having a first end being conventionally attached to the back cover 13 and also having a free being spaced from the back cover 13. The inner longitudinal edge of the front cover 12 is pivotally and conventionally attached to an inner longitudinal edge of the back cover 13.

A tab/check member 22 includes a piece of paper being removably held within the book 11 and having indicia 23 conventionally displayed thereupon. The indicia 23 displayed upon the tab/check member 22 includes listings of food/drink items purchased by a customer, and also includes prices for the food/drink items purchased by the customer. The tab/check member 22 is removably inserted in the first pocket 19.

An elongate magnifying member 24 is movably attached to the book 11 for enlarging the indicia 23 for a user to easily view without having to use eyeglasses. The elongate magnifying member 24 includes a generally flat bar portion 25 being movably disposed upon the front cover 12 and comprising a magnifying lens for enlarging the indicia 23 displayed upon the tab/check member 22, and also includes end portions 26,27 being removably received in the first and second elongate slots 17,18, and further includes a handle tab portion 32 being integrally attached to and extending outwardly from one of the end portions 26 for the customer to grasp to move the elongate magnifying member 24 along a length of the front cover 12 and upon the tab/check member 22. The end portions 26,27 of the elongate magnifying member 24 have L-shaped lateral cross-sections to effectively support the elongate magnifying member 24 upon the front cover 12.

A light-emitting assembly is conventionally attached to the book 11 for providing light between the front and back covers 12,13 upon the book 11 being opened. The light-emitting assembly includes an elongate light-emitting member 28 being removably and conventionally attached to the back cover 13, in particular to the side 15 facing the front cover 12, and also includes a power switch 29 being depressibly and conventionally disposed upon the back cover 13, in particular, upon the side 15 facing the front cover 12, and being conventionally connected to the elongate light-emitting member 28, and further includes a battery 30 being removably and conventionally disposed in the back cover 13 and being conventionally connected to the power switch 29 for energizing the elongate light-emitting member 28. A writing utensil 31 is removably supported upon the book 11. The writing utensil 31 is removably clipped to the back cover 13 with the clip 21.

In use, the user would place the tab/check member 22 in the first pocket 19 of the book 11 behind the elongate magnifying member 24, and would present the book 11 to the customer who would open the book 11 with the elongate light-emitting member 28 becoming illuminated upon the power switch 29 being let out and turned on which energizes the elongate light-emitting member 28. The customer grasps the handle tab portion 32 of the elongate magnifying member 24 and moves the elongate magnifying member 24 upon the tab/check member 22 which magnifies and enlarges the indicia 23 printed upon the tab/check member 22 so that the customer can easily read the indicia 23.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the food/drink tab/check holder. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food/drink tab/check holder comprising:

a book having a front cover and a back cover being pivotally connected to said front cover and closable upon said front cover, said front cover having a side facing said back cover upon said book being closed, said back cover having a side facing said front cover upon said book being closed, said book including a first pocket being disposed upon said front cover, in particular, upon said side facing said back cover; and also including a second pocket being disposed upon said back cover, in particular, upon said side facing said front cover and being adapted to hold a credit card therein; and further including a clip being attached to said back cover, in particular, to said side facing said front cover, said book further including a first elongate slot being disposed in an outer longitudinal edge of said front cover and extending from near a bottom edge through a top edge of said front cover, and also including a second elongate slot being disposed in said front cover, in said side facing said back cover near an inner longitudinal edge of said front cover and extending from near said bottom edge through said top edge of said front cover;

a tab/check member including a piece of paper being removably held within said book and having indicia displayed thereupon;

an elongate magnifying member being movable received in said first and second slots for enlarging said indicia for a user to easily view without having to use eyeglasses;

a light-emitting assembly being attached to said book for providing light between said front and back covers upon said book being opened; and a writing utensil being removably supported upon said book.

2. A food/drink tab/check holder as described in claim 1, wherein said second elongate slot has an L-shaped lateral cross-section.

3. A food/drink tab/check holder as described in claim 2, wherein said clip includes an arcuate-shaped member having a first end being attached to said back cover and also having a free being spaced from said back cover.

4. A food/drink tab/check holder as described in claim 3, wherein said indicia displayed upon said tab/check member includes listings of food/drink items purchased by a customer, and also includes prices for said food/drink items purchased by the customer.

5. A food/drink tab/check holder as described in claim 4, wherein said tab/check member is removably inserted in said first pocket.

6. A food/drink tab/check holder as described in claim 5, wherein said elongate magnifying member includes a generally flat bar portion being movably disposed upon said front cover and comprising a magnifying lens for enlarging said indicia displayed upon said tab/check member, and also includes end portions being removably received in said first and second elongate slots, and further includes a handle tab portion being attached to and extending outwardly from one of said end portions for the customer to grasp to move said elongate magnifying member along a length of said front cover and upon said tab/check member.

7. A food/drink tab/check holder as described in claim 6, wherein said end portions of said elongate magnifying member have L-shaped lateral cross-sections to effectively support said elongate magnifying member upon said front cover.

8. A food/drink tab/check holder as described in claim 7, wherein said light-emitting assembly includes an elongate light-emitting member being removably attached to said back cover, in particular to said side facing said front cover, and also includes a power switch being depressibly disposed upon said back cover, in particular, upon said side facing said front cover, and being connected to said elongate light-emitting member, and further includes a battery being removably disposed in said back cover and being connected to said power switch for energizing said elongate light-emitting member.

9. A food/drink tab/check holder as described in claim 8, wherein said writing utensil is removably clipped to said back cover with said clip.

* * * * *